(12) United States Patent
Barjhoux et al.

(10) Patent No.: US 12,422,185 B2
(45) Date of Patent: Sep. 23, 2025

(54) FACILITY AND METHOD FOR REFRIGERATION AND/OR LIQUEFACTION OF A FLUID

(71) Applicant: L'Air Liquide, Societe Anonyme pour l'Etude et l'Exploitation des Procedes Georges Claude, Paris (FR)

(72) Inventors: Pierre Barjhoux, Sassenage (FR); Franck Delcayre, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 286 days.

(21) Appl. No.: 18/030,369

(22) PCT Filed: Sep. 28, 2021

(86) PCT No.: PCT/EP2021/076593
§ 371 (c)(1),
(2) Date: Apr. 5, 2023

(87) PCT Pub. No.: WO2022/073799
PCT Pub. Date: Apr. 14, 2022

(65) Prior Publication Data
US 2023/0375259 A1    Nov. 23, 2023

(30) Foreign Application Priority Data
Oct. 5, 2020   (FR) ........................................ 2010132

(51) Int. Cl.
F25J 1/00      (2006.01)
F16C 32/06     (2006.01)
F25J 1/02      (2006.01)

(52) U.S. Cl.
CPC ............ *F25J 1/005* (2013.01); *F16C 32/0614* (2013.01); *F25J 1/0007* (2013.01); *F25J 1/001* (2013.01); *F25J 1/0257* (2013.01)

(58) Field of Classification Search
CPC .......... F25J 1/005; F25J 1/0007; F25J 1/0257; F16C 32/0614; F25B 9/06
See application file for complete search history.

(56) References Cited

U.S. PATENT DOCUMENTS 3,105,631 A      10/1963  Hanny
2020/0292211 A1*  9/2020  Saito ...................... F25J 1/0065

FOREIGN PATENT DOCUMENTS

CH       393 382        6/1965
DE     19 38 830        2/1971
(Continued)

OTHER PUBLICATIONS

International Search Report and Written Report for PCT/EP2021/076593, mailed Dec. 8, 2021.
French Search Report and Written Opinion for FR 2 010 132, mailed Jun. 10, 2021.

*Primary Examiner* — Brian M King
(74) *Attorney, Agent, or Firm* — Justin K. Murray

(57) ABSTRACT

Disclosed is a facility for the refrigeration and/or liquefaction of a fluid, comprising a circuit of fluid to be cooled comprising an upstream end intended to be connected to a source of fluid to be cooled and a downstream end intended to be connected to a member for collecting the cooled and/or liquefied fluid; the facility comprising an assembly of heat exchanger(s) in thermal exchange with the circuit of fluid to be cooled; the facility comprising a cooling device in thermal exchange with the assembly of heat exchange(s); the cooling device comprising a refrigerator with a refrigeration cycle for a cycle gas in a working circuit; the working circuit of the refrigerator comprising, a mechanism for compressing the cycle gas, a system for cooling the cycle gas, a mecha- (Continued)

nism for expanding the cycle gas and a system for heating the cycle gas; the mechanism for expanding the cycle gas comprising several turbines secured to shafts mounted so as to be able to rotate on aerostatic bearings; the facility comprising mechanisms for braking the turbines, the braking mechanisms each comprising a braking compressor secured to a shaft of a turbine and a braking gas circuit incorporating the braking compressor; the braking gas circuits comprising a system for cooling the braking gas downstream of the braking compressor and a mechanism for expanding the braking gas; the facility being equipped with a compressed lifting gas circuit comprising an end connected to a compressed lifting gas source and a downstream end connected to the bearings, and wherein the compressed lifting gas source comprises at least one of the braking circuits.

7 Claims, 1 Drawing Sheet

(56) References Cited

FOREIGN PATENT DOCUMENTS

| | | |
|---|---|---|
| EP | 3 702 588 | 9/2020 |
| WO | WO 2016/203767 | 12/2016 |

\* cited by examiner

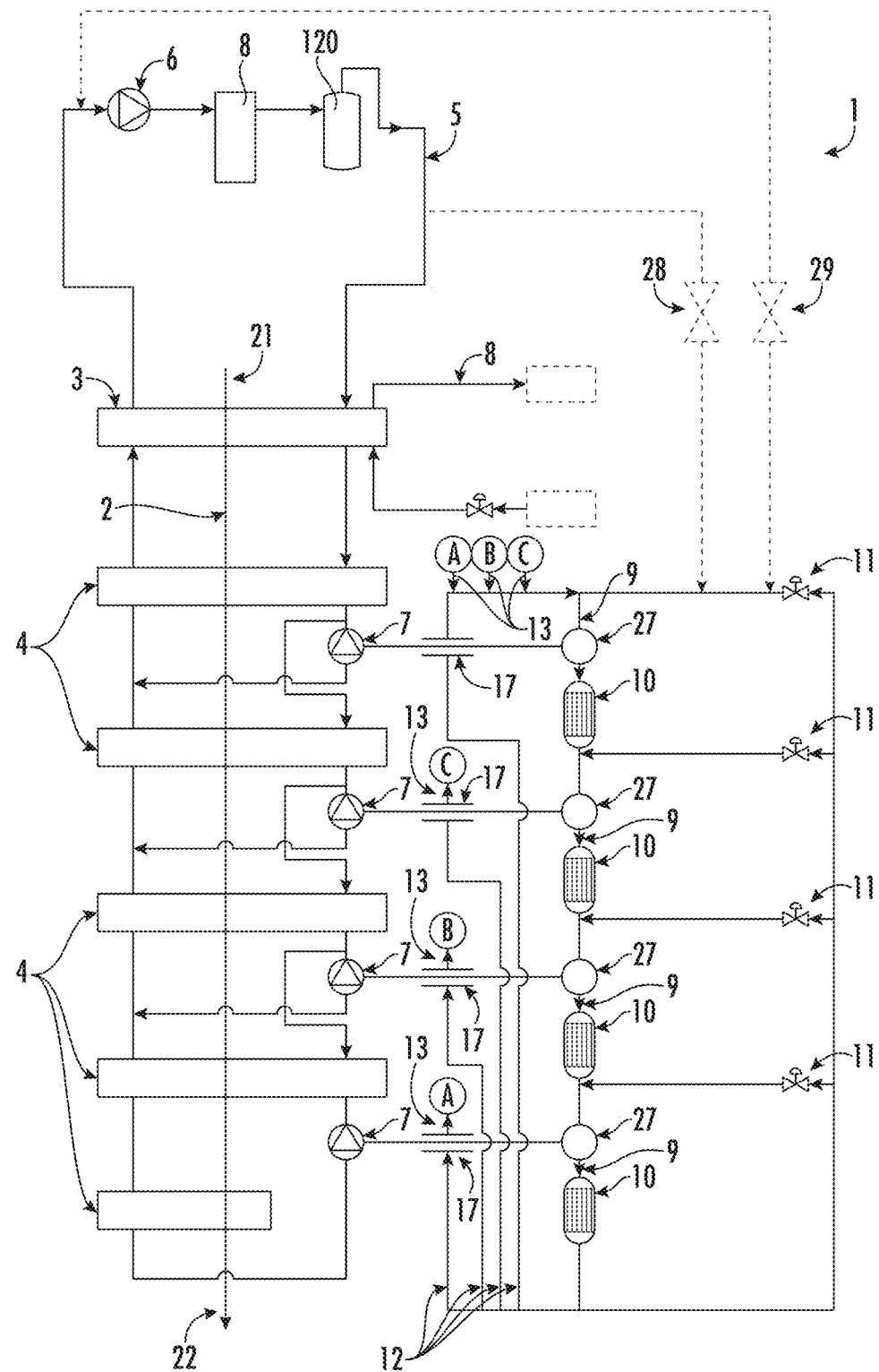

FACILITY AND METHOD FOR REFRIGERATION AND/OR LIQUEFACTION OF A FLUID

CROSS REFERENCE TO RELATED APPLICATIONS

This application is a § 371 of International PCT Application PCT/EP2021/076593, filed Sep. 28, 2021, which claims the benefit of FR2010132, filed Oct. 5, 2020, both of which are herein incorporated by reference in their entireties.

FIELD OF THE INVENTION

The invention relates to a facility and method for refrigeration and/or liquefaction of a fluid.

BACKGROUND OF THE INVENTION

A number of cryogenic refrigerators or liquefiers use turbines for expanding cycle gas having bearings known as "static" or "aerostatic".

These gas turbines on static bearings require a continual supply of pressurized gas to the bearings in order to support the rotating shaft.

Conventionally, a portion of the flow of the cycle gas of the method is compressed at ambient temperature and is not expanded during the method for cooling the main fluid, but is injected at the bearings of each turbine of the method to provide support. Some of the compressed cycle gas is thus not used to extract energy from the application to be cooled.

Another solution consists of using "dynamic" gas bearings, in which no gas is injected to support the rotating shaft, but this technology is not very robust during starting and stopping and requires an air wedge architecture, resulting in a degree of sensitivity to variations in load (related to the necessary reduced clearance, in particular when using light gas working fluids such as helium and hydrogen).

One aim of the present invention is to overcome all or some of the drawbacks of the prior art set out above.

SUMMARY OF THE INVENTION

To this end, the facility according to the invention, which otherwise complies with the generic definition thereof given in the above preamble, is essentially characterized in that the source of compressed supporting gas comprises at least one of the braking circuits.

This makes it possible to eliminate or reduce the consumption of compressed cycle gas by the main compressor.

The braking gas is thus capable of supplying sufficient pressure potential energy in order to support all or some of the rotating shafts.

In certain embodiments, the invention relates more particularly to a facility for refrigeration and/or liquefaction of a fluid comprising a circuit of fluid to be cooled, comprising an upstream end suitable for being connected to a source of fluid to be cooled and a downstream end suitable for being connected to a member for collecting the cooled and/or liquefied fluid, the facility comprising a set of heat exchangers in heat exchange with the circuit of fluid to be cooled, the facility comprising a cooling device in heat exchange with the set of heat exchangers, said cooling device comprising a refrigerator having a cycle of refrigeration of a cycle gas in a working circuit, the working circuit of the refrigerator comprising a mechanism for compressing the cycle gas, a system for cooling the cycle gas, a mechanism for expanding the cycle gas and a system for reheating the cycle gas, the mechanism for expanding the cycle gas comprising a plurality of turbines rigidly connected to shafts rotatably mounted on aerostatic bearings, the facility comprising mechanisms for braking the turbines, said braking mechanisms each comprising a braking compressor rigidly connected to a shaft of a turbine and a braking gas circuit incorporating the braking compressor, the braking gas circuits comprising a system for cooling the braking gas downstream of the braking compressor and a mechanism for expanding the braking gas, the facility being provided with a compressed supporting gas circuit comprising an end connected to a source of compressed supporting gas and a downstream end connected to the bearings.

Furthermore, embodiments of the invention can include one or more of the following features:

- a plurality of braking gas circuits are fluidically connected in a common circuit in which the braking compressors are positioned in series, and the source of compressed supporting gas comprises one end of the common circuit downstream of the braking compressors in series,
- the compressed supporting gas circuit comprises respective delivery pipes each comprising an upstream end connected to the common circuit downstream of the compressors in series and a downstream end connected to an inlet of a bearing,
- the compressed supporting gas circuit comprises respective return pipes each comprising an upstream end connected to an outlet of a bearing and a downstream end connected to the common circuit, upstream of the compressors in series.

In certain embodiments, the invention also relates to a method for refrigeration and/or liquefaction of a fluid using a facility according to any one of the features above or below, and comprising a step of withdrawing at least part of the stream of braking gas from at least one of the braking circuits downstream of the braking compressor, a step of injecting said withdrawn gas into at least one bearing to support the turbine shaft, a step of recovering the braking gas having circulated in the bearing and a step of returning said recovered gas to the at least one braking circuit.

According to other possible features:

- the method comprises a step of injecting a supporting gas flow from a source of pressurized braking gas separate from the braking circuits at least during a starting and/or stopping phase of the facility,
- the stream of braking gas injected into the bearing(s) has a pressure of between five and sixty bar,
- the braking gas comprises at least one of: He, H2, Ne, N2, O2, Ar, Co, CO2, CH4 or other compounds of air.

In certain embodiments, the invention can also relate to any alternative device or method comprising any combination of the features above or below within the scope of the claims.

BRIEF DESCRIPTION OF THE DRAWINGS

Further features, advantages and possible applications of the invention are apparent from the following description of working and numerical examples and from the drawings. All described and/or depicted features on their own or in any desired combination form the subject matter of the invention, irrespective of the way in which they are combined in the claims or the way in which said claims refer back to one another.

FIG. 1 depicts a diagrammatic and partial view illustrating an example of the structure and operation of a refrigeration and/or liquefaction facility according to the invention.

DETAILED DESCRIPTION OF THE INVENTION

The facility 1 shown by way of example is a cryogenic refrigerator and/or liquefier for a fluid.

This facility 1 comprises a circuit 2 of fluid to be cooled/liquefied comprising an upstream end 21 suitable for being connected to a source of fluid to be cooled and a downstream end 22 suitable for being connected to a member for collecting the cooled and/or liquefied fluid.

The fluid to be cooled can comprise for example hydrogen, helium, neon, or any other gas in air or other mixture.

To this end, the facility 1 comprises a set of heat exchangers 3, 4 in series, in heat exchange with the circuit 2 of fluid to be cooled.

The facility 1 comprises a cooling device in heat exchange with the set of heat exchangers 3, 4. The cooling device comprises a refrigerator 5 with a cycle of refrigeration of a gas in a working circuit. This cycle gas comprises for example at least one of hydrogen, helium, neon, etc.

The working circuit of the refrigerator 5 (preferably a closed loop circuit) comprises a mechanism 6 for compressing the cycle gas (one or more compressors), a system 3, 4 for cooling the cycle gas (one or more exchangers, for example counterflow heat recovery exchangers as shown), a mechanism 7 for expanding the cycle gas and a system 4, 3 for reheating the cycle gas (for example all or some of the aforementioned heat exchangers).

The mechanism 7 for expanding the cycle gas comprises a plurality of turbines 7 (in series in this example, but some of which could be mounted in parallel to expand separate fractions of the stream of cycle gas).

In the example shown, each turbine 7 is mounted at one end of a rotating shaft mounted on an aerostatic bearing 17.

The facility 1 comprises separate braking mechanisms for each of the turbines 7.

Each braking mechanism comprises a braking compressor 27 rigidly connected to the other end of the shaft holding the turbine 7 and a braking gas circuit 9 incorporating the braking compressor 27. The braking circuit of each turbine 7 forms a loop comprising, in series, a system 10 for cooling the braking gas downstream of the braking compressor 27 (for example a braking gas exchanger with a heat transfer fluid such as water or air) and a mechanism 11 for expanding the braking gas downstream (an expansion valve or calibrated orifice for example). Each braking circuit can thus form a loop of braking gas that is compressed in a brake wheel forming a compressor, then cooled, then expanded, etc.

The facility 1 is provided with a circuit of compressed gas for supporting the shaft of the turbines 7.

According to one advantageous specific feature, this pressurized supporting gas is supplied to the bearing(s) 17 by the braking gas circuit(s) 9 (instead of or in addition to the cycle gas).

Preferably, a plurality of braking gas circuits 9 (for example all of them) are fluidically connected in a common circuit in which the braking compressors 27 are positioned in series with intermediate cooling.

In other words, the braking compressors 27 in series can be situated in a common loop. The braking gas leaving the last braking compressor 27 (downstream) can be expanded in the expander 11 of the first compressor (upstream).

As illustrated, the braking circuits of each of the braking compressors 27 can include bypass pipes each provided with (a) valve(s) and/or an expander 11 (and/or (a) calibrated orifice(s)), respectively connecting the common circuit to the intake inlet of each of the intermediate braking compressors 27 between the first braking compressor 27 (upstream) and the last braking compressor 27 (downstream). In one possible variant, all or part of the stream(s) could be returned to the intake of the first compressor.

If applicable, this configuration makes it possible to adjust the compressed braking gas flow in each stage of a braking compressor 27. This braking flow can be adjusted to the requirements of each rotating shaft subject to axial and radial forces.

The source of compressed supporting gas can be situated at one end of the common circuit, downstream of the last of the braking compressors 27 in series. This makes available a sufficient flow of pressurized gas to support all or some of the shafts of the turbines 7. The common braking circuit combines the braking gas from the various braking circuits.

As illustrated, the compressed supporting gas circuit can comprise a plurality of respective pressurized gas delivery pipes 12 each comprising an upstream end connected to the common circuit downstream of the compressors 17 in series and a downstream end connected to an inlet of a respective bearing 17. In other words, the common circuit supplies the bearings 17 with supporting gas, via respective parallel lines.

Likewise, the compressed supporting gas circuit can comprise respective return pipes 13 each comprising an upstream end connected to an outlet of a bearing 17 and a downstream end connected to the common circuit, upstream of the first braking compressor 27 in series. In other words, the streams of pressurized gas that have been used to support the bearings 17 are then returned to the common braking circuit (cf. reference signs A, B and C, which represent the return of the streams of supporting gas to the braking circuit to facilitate understanding of the streams).

This sharing of the braking circuits makes it possible to achieve higher working gas flows and pressures compared to the use of separate braking gases from different, independent braking circuits.

The common braking circuit has a high overall compression rate, thus making it possible to supply sufficient pressure potential energy in order to support all of the rotating shafts. For example, depending on the facility, this arrangement makes it possible to supply a stream of pressurized supporting gas at a flow rate of between 10 and 50 grammes per second and a pressure of between 15 and 50 bar.

The invention has a number of advantages: a high available compression rate makes it possible to support the rotating shafts while making it possible to eliminate cycle gas consumption to this end. This improves the efficiency and cost of the facility 1 (for example by the order of 2 to 10%).

As illustrated, the working circuit of the refrigerator 5 can comprise, at the outlet of the compression mechanism 6, a buffer tank 120 for storing pressurized cycle gas that can be used as a supporting gas in the bearings 17 if necessary (during transitional phases of the facility, in particular starting and stopping phases) for example by means of a bypass pipe downstream of the buffer tank 120 provided with a valve 28. This gas supplied by the buffer tank 120 can be used in particular during certain transitional phases and/or during an adjustment phase on start-up of the turbines 7.

Alternatively or additionally, a pipe can be provided (with a valve 29) for discharging braking gas to the intake of the cycle compressor 6 (during a transitional phase for example without affecting the output of the refrigerator).

As also illustrated, a system 8 for cooling the compressed cycle gas can be provided between the compression mechanism 6 and the buffer tank 120.

Of course, the invention is not limited to this exemplary embodiment. The separate cooling exchangers 10 of the braking circuits could thus be combined inside a single piece of equipment. In the example shown, the four heat transfer fluid circuits for cooling the braking gas could be cooled by a common heat transfer fluid circuit (water or glycol water for example). These circuits could be housed inside a single piece of equipment.

Likewise, the circuit of the refrigerator 5 could include one or more intermediate working pressures (for example, an intermediate pressure stage on which the first two upstream turbines could be installed in series, wherein the exhaust of the second turbine would be connected to this intermediate pressure stage).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A facility for refrigeration and/or liquefaction of a fluid comprising a circuit of fluid to be cooled, the facility comprising:

an upstream end configured to be connected to a source of fluid to be cooled and a downstream end configured to be connected to a member for collecting the cooled and/or liquefied fluid;

a set of heat exchangers in heat exchange with the circuit of the fluid to be cooled;

a cooling device in heat exchange with the set of heat exchangers, said cooling device comprising a refrigerator having a cycle of refrigeration of a cycle gas in a working circuit, the working circuit of the refrigerator comprising a compressor configured to compress the cycle gas, a system configured to cool the cycle gas, a means for expanding the cycle gas and a system for reheating the cycle gas, the means for expanding the cycle gas comprising a plurality of turbines rigidly connected to shafts rotatably mounted on aerostatic bearings;

a plurality of braking compressors configured to apply a braking force to the plurality turbines, wherein each of the plurality of braking compressors is rigidly connected to the shaft of one of the plurality of turbines;

a plurality of braking gas circuits each comprising one of the plurality of braking compressors, wherein each of the plurality of braking gas circuits further comprises a system for cooling the braking gas downstream of the braking compressor and a mechanism for expanding the braking gas; and a compressed supporting gas circuit comprising an end connected to a source of compressed supporting gas and a downstream end connected to the bearings, the source of compressed supporting gas comprising at least one of the braking circuits, wherein the plurality of the braking gas circuits are fluidically connected in a common circuit in which the plurality of braking compressors are positioned in series and in that the source of compressed supporting gas comprises one end of the common circuit downstream of the plurality of braking compressors in series.

2. The facility as claimed in claim 1, wherein the compressed supporting gas circuit comprises a plurality of delivery pipes each comprising an upstream end connected to the common circuit downstream of the compressors in series and a downstream end connected to an inlet of one of the bearings.

3. The facility as claimed in claim 1, wherein the compressed supporting gas circuit comprises respective return pipes each comprising an upstream end connected to an outlet of one of the bearings and a downstream end connected to the common circuit, upstream of the compressors in series.

4. A method for refrigeration and/or liquefaction of a fluid using a facility as claimed in claim 1, wherein the method comprises the steps of:

withdrawing at least part of the stream of braking gas from an end of the common circuit downstream of the braking compressors in series;

injecting said withdrawn gas into at least one bearing to support the turbine shaft;

recovering the braking gas having circulated in the bearing; and returning said recovered gas to the at least one braking circuit.

5. The method as claimed in claim 4, wherein the method further comprises injecting a supporting gas flow from a source of pressurized braking gas separate from the braking circuits at least during a starting and/or stopping phase of the facility.

6. The method as claimed in claim 4, wherein the stream of braking gas injected into the bearing(s) has a pressure of between five and sixty bar.

7. The method as claimed in claim 4, wherein the braking gas comprises at least one of: He, H2, Ne, N2, O2, Ar, Co, CO2, CH4 or other compounds of air.

* * * * *